(12) United States Patent
Monden et al.

(10) Patent No.: US 7,920,224 B2
(45) Date of Patent: Apr. 5, 2011

(54) DISPLAY DEVICE

(75) Inventors: Takuya Monden, Kumamoto (JP);
Kenji Teramoto, Kumamoto (JP);
Masahiko Uno, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 185 days.

(21) Appl. No.: 12/250,850

(22) Filed: Oct. 14, 2008

(65) Prior Publication Data
US 2009/0103000 A1    Apr. 23, 2009

(30) Foreign Application Priority Data

Oct. 17, 2007  (JP) ............................. P2007-270091
Mar. 24, 2008  (JP) ............................. P2008-075681

(51) Int. Cl.
*G02F 1/1333*  (2006.01)
(52) U.S. Cl. ....................................................... 349/58
(58) Field of Classification Search ................... 349/58
See application file for complete search history.

(56) References Cited

U.S. PATENT DOCUMENTS

| 5,779,339 | A  | * | 7/1998  | Konishi et al. ............... 362/606 |
| 7,139,062 | B2 | * | 11/2006 | Saitoh ........................... 349/161 |
| 7,384,179 | B2 | * | 6/2008  | Sakai ............................. 362/632 |
| 7,554,624 | B2 | * | 6/2009  | Kusuda et al. .................. 349/58 |
| 2007/0222912 | A1 | * | 9/2007  | Sato et al. ........................ 349/58 |
| 2007/0241993 | A1 |   | 10/2007 | Monden et al. |
| 2009/0087655 | A1 |   | 4/2009  | Yamada et al. |

FOREIGN PATENT DOCUMENTS

| JP | 2003-29644 | 1/2003 |
| JP | 2003-29645 | 1/2003 |
| JP | 2006-290960 | 10/2006 |
| WO | WO 2006/123616 A1 | 11/2006 |

* cited by examiner

*Primary Examiner* — Mark A Robinson
*Assistant Examiner* — Eric Wong
(74) *Attorney, Agent, or Firm* — Oblon, Spivak, McClelland, Maier & Neustadt, L.L.P.

(57) ABSTRACT

A display device includes a display panel having a display plane, a frame having an opening formed at an area corresponding to the display plane, for holding the periphery of the display panel, a protecting cover for protecting the display plane, and two transparent adhesive sheets arranged in the gap between the display plane and the protecting cover.

5 Claims, 2 Drawing Sheets

DISPLAY DEVICE

This application claims priority from Japanese Patent Application No. 2007-270091 filed on Oct. 17, 2007 and Japanese Patent Application No. 2008-75681 filed on Mar. 24, 2008, the entire subject matter of which is incorporated herein by reference.

BACKGROUND OF THE INVENTION

1. Field of the Invention

This invention relates to a display device provided with a protecting cover, and particularly to a display device which is preferably applied to a liquid crystal display device.

2. Description of the Related Art

In an outdoor setting-up display device using liquid crystal, in many cases, in order to protect the display panel from outside shock or flooding due to rainfall, the display plane of a display panel is covered with a transparent protecting cover made of resin or glass and is subjected to waterproofing at the periphery thereof.

Where the protecting cover is arranged on the display plane of the display panel, since an air layer exists between the display panel and protecting cover, a problem occurs that outside light incident on the display plane reflects from the front and back sides of the transparent protecting cover and the surface of a flat panel, thereby to deteriorate visibility.

In order to solve such a problem, some techniques were proposed in which the gap between the display panel and protecting cover is filled with transparent resin, or a light permeable adhesive sheet is arranged in the gap (for example, see JP-A-2006-290960).

In the technique in which the gap between the display panel and the protecting cover is filled with the liquid transparent resin, the resin invades the inside of the display panel from the gap between the frame holding the display panel and the display panel, thereby providing a problem of making the resin invaded inside visible. In order to solve this problem, it was necessary to form a sealing member for suppressing invasion of the resin between the frame and the display panel, thereby increasing the working number of man-hours.

Further, in the technique in which the transparent adhesive sheet is arranged in the gap between the display panel and protecting cover so that the protecting cover is affixed to the display panel, a level difference is generated between the frame arranged so as to cover the periphery edge of the display plane of the display panel and the display plane of the display panel. For this reason, in affixing the protecting cover using the transparent adhesive sheet, air bubbles get mixed in the vicinity of the level difference, thereby remarkably deteriorating the display quality. In order to suppress the air bubbles, it is necessary to arrange the transparent adhesive sheet on only the display plane of the display device. However, in this configuration, the frame, display panel and protecting cover cannot be secured, thereby giving a problem of reducing the shocking strength of the display device.

SUMMARY OF THE INVENTION

In view of these problems, this invention has been accomplished. An object of this invention is to provide a display device which prevents resin from invading the inside of the display panel by not using liquid resin and suppresses generation of air bubbles in the vicinity of the level difference portion of the frame, thereby not deteriorating the display quality.

This invention provides a display device comprising: a display panel having a display plane; a frame having an opening formed at an area corresponding to the display plane, for holding the periphery of the display panel; a protecting cover for protecting the display plane; and two transparent adhesive sheets arranged in the gap between the display plane and the protecting cover.

In accordance with this invention, there can be provided a display device which does not generate air bubbles in the vicinity of the level difference portion of a frame on the display plane of a display panel, thereby not deteriorating the display quality. Further, since liquid resin is not employed, dealing in bonding can be facilitated thereby to simplify the manufacturing method. Further, since the frame can be secured by the transparent adhesive sheet, the shocking strength of the display device can be improved.

DETAILED DESCRIPTION OF THE PREFERRED EMBODIMENTS

Embodiment 1

Figure 1:
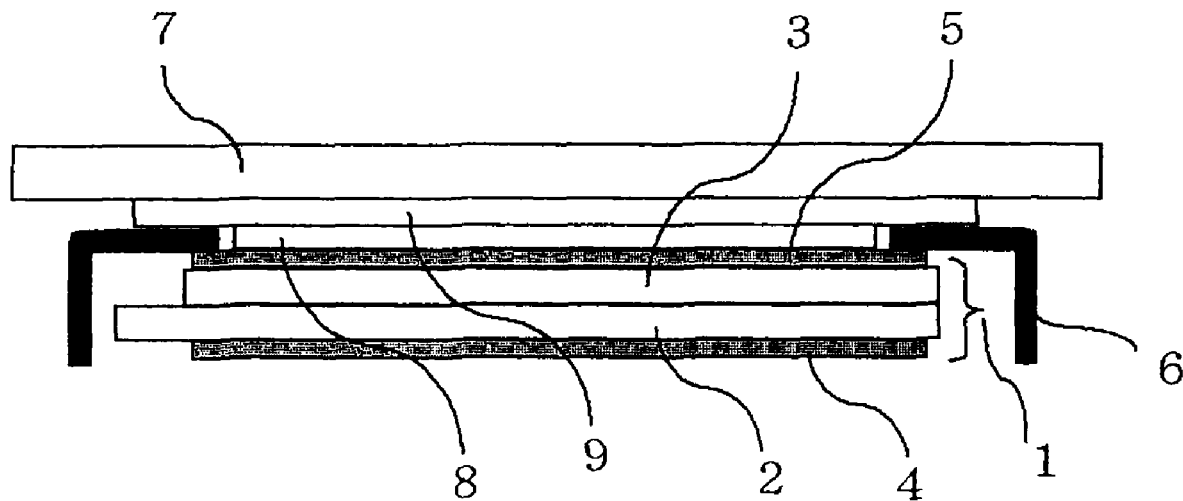
FIG. 1 is a sectional view of a display device according to the first embodiment of this invention.
Figure 2:
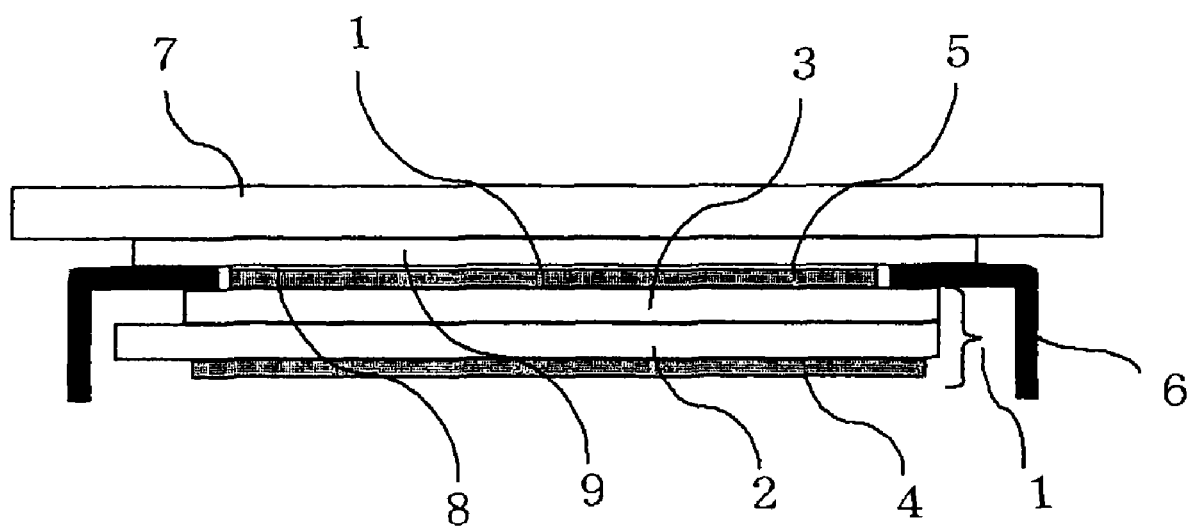
FIG. 2 is a sectional view of another display device according to the first embodiment of this invention.

Referring to FIGS. 1 and 2, the first embodiment will be explained. FIG. 1 is a sectional view of a display device 100 according to the first embodiment of this invention. FIG. 2 is a sectional view of another display device 101 according to the first embodiment of this invention.

Referring to FIG. 1, a display panel 1 formed of e.g. liquid crystal is composed of an insulating substrate 2 including a thin-film transistor array and an opposite substrate 3 arranged oppositely to the insulating substrate 2 through the liquid crystal. Polarizing plates 4, 5 are affixed to the respective outer surfaces of the insulating substrate 2 and opposite substrate 3 in the display panel 1. In FIG. 1, the outer surface of the opposite substrate 3 corresponds to a display plane; in the area corresponding to the display plane, an opening is formed; and a frame 6 is arranged for holding the periphery of the display plane. Further, the display panel 1 is thereafter mounted with a driving circuit for driving the liquid crystal, a circuit board, etc. not shown in this embodiment.

In the display panel 1, a planar light source not shown is arranged on the outer side of the insulating substrate 2 (on the lower side of paper face in the figure). The frame 6 is fit to the planar light source to constitute the display device. The opening of the frame 6 is formed to have a size smaller than that of the polarizing plate 5 of the opposite plate 3 so that the end of the frame 6 is located on the polarizing plate 5.

A protecting cover 7 is arranged on the polarizing plate 5 of the opposite substrate 3, and two transparent adhesive sheets 8, 9 are arranged in the gap between the polarizing plate 5 and the protecting cover 7. Of these two transparent adhesive sheets, the first transparent sheet 8 in proximity to the opposite substrate 3 is formed to have a size smaller than that of the opening of the frame 6 by a predetermined amount (0.5 to 1.0 mm or so). The first transparent sheet 8 is formed to have a thickness approximately equal to that of the end of the frame 6 covering the periphery of the display plane of the display panel 1. The second transparent adhesive sheet 9 in proximity to the protecting cover 7 is arranged over the first transparent adhesive sheet 8 and frame 6 and has a size larger than that of the opening of the frame 6. The second transparent adhesive sheet 9 bonds the frame 6 and the polarizing plate 5 of the opposite substrate 3 to the protecting cover 7 through the first transparent adhesive sheet 8.

As described above, the size of the first transparent adhesive sheet 8 is made smaller than that of the opening of the frame 6 and the thickness thereof is made approximately equal to that of the end of the frame 6 covering the periphery of the display plane of the display panel 1. For this reason, in bonding the display panel 1 and the protecting cover 7 to each other by the second transparent adhesive sheet 9, a level difference can be eliminated between the upper surface of the end of the frame 6 and the upper surface of the polarizing plate 5 of the opposite substrate 3. Thus, the air bubbles due to the level difference can be suppressed, thereby providing the display device with excellent quality. Further, the frame 6 can be also secured by the second transparent adhesive sheet 9 so that the shocking strength of the display device can be improved. Now, the protecting cover 7 should not be particularly limited as long as it is made of a material capable of protecting the display area of the display panel 1. Namely, it may be made of an insulating material such as glass or acryl, but is preferably made of reinforced glass with antireflective coating.

FIG. 2 is a sectional view of another display device 101 according to this embodiment. This display device 101 is different from the display device 100 shown in FIG. 1 in that a size of the polarizing plate 105 of the opposite substrate 3 in the another display device 101 is smaller than that of the opening formed in the frame 6. In FIG. 2, therefore, the end of the frame 6 covering the periphery of the display plane is arranged directly on the opposite substrate 3. In this way, by arranging the polarizing plate 105 of the opposite substrate 3 within the opening of the frame 6, level difference can be decreased between the upper surface of the end of the frame 6 and the upper surface of the polarizing plate 105 of the opposite substrate 3 (As compared with the case of FIG. 1, the level difference can be decreased by the thickness of the polarizing plate). Thus, as compared with the case of FIG. 1, the thickness of the first transparent adhesive sheet 108 in the another display device 101 can be decreased. Accordingly, the thickness of the first transparent adhesive sheet 108 can be decreased so that the first transparent adhesive sheet 108 can be manufactured at low cost.

Embodiment 2

Figure 3:
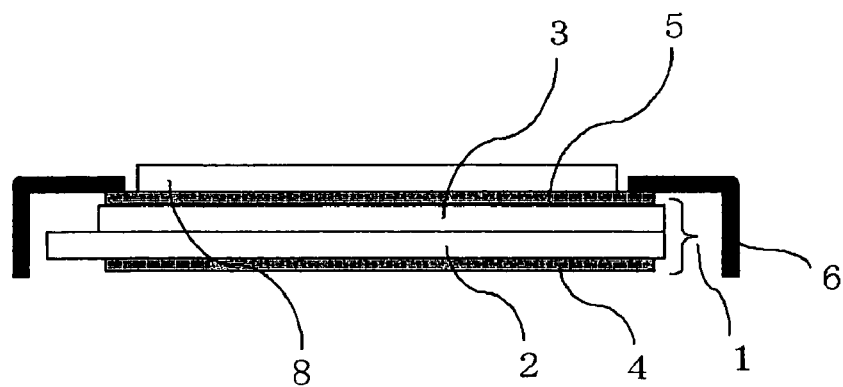
FIG. 3 is a sectional view of a display device according to the second embodiment of this invention.
Figure 4:
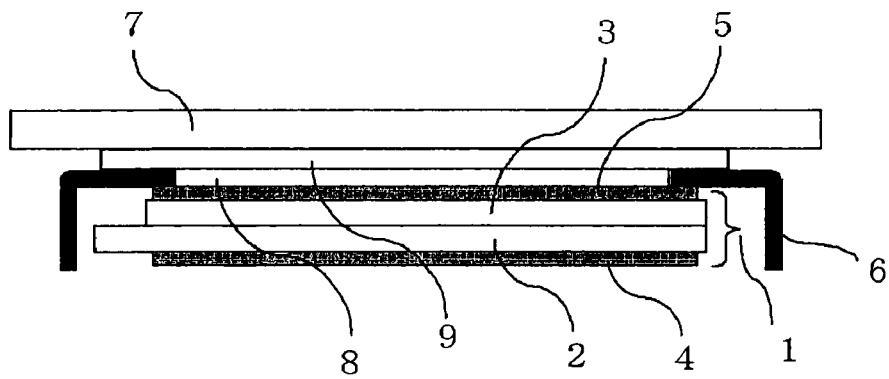
FIG. 4 is a sectional view of another display device according to the second embodiment of this invention.

Referring to FIGS. 3 and 4, the second embodiment of this invention will be explained. FIGS. 3 and 4 are sectional views of a display device 200 according to the second embodiment of this invention. In FIGS. 3 and 4, with like reference symbols referring to like components in FIGS. 1 and 2, a difference from the first embodiment will be explained below.

In FIG. 3, the size of the polarizing plate 5 of the opposite substrate 3 is larger than that of the opening of the frame 6, and the end of the frame 6 is located on the polarizing plate 5 (the same structure as in FIG. 1). The first transparent adhesive sheet 208 according to the Embodiment 2 is formed to have a size smaller than that of the opening of the frame 6, and to have a thickness larger than that of the end of the frame 6 by a predetermined amount (0.1 to 0.2 mm is desirable but it may be further greater).

FIG. 4 is a sectional view of the display device in which the protecting cover 7 is affixed to the display device shown in FIG. 3 through the second transparent adhesive sheet 9. Referring to FIG. 4, the second transparent adhesive sheet 9 bonds the frame 6 to the protecting cover 7 so that the first transparent adhesive sheet 208 is put between the second transparent adhesive sheet 9, protecting cover 7 and the polarizing plate 5 thereby to suffer from crushing strength. As a result, the elastic or plastic deformation thus generated of the first transparent adhesive sheet 9 can bridge the gap between the frame 6 and the first transparent adhesive sheet 208.

In the structure described above, by eliminating the gap between the frame 6 and the first transparent adhesive sheet 208, generation of the air bubbles can be suppressed, thereby providing the display device with excellent quality.

Embodiment 3

Figure 5:
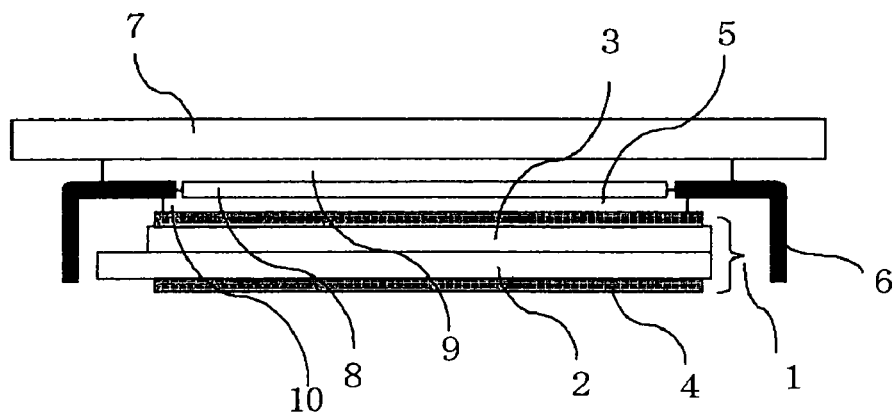
FIG. 5 is a sectional view of a display device according to the third embodiment of this invention.

Referring to FIG. 5, the third embodiment of this invention will be explained. FIG. 5 is a sectional view of a display device 300 according to the third embodiment of this invention. In FIG. 5, with like reference symbols referring to like components in FIGS. 1 to 4, a difference from the first embodiment and second embodiment will be explained below.

Referring to FIG. 5, the size of the polarizing plate 5 of the opposite substrate 3 is larger than that of the opening of the frame 6. Arranged on the polarizing plate 5 is a third transparent adhesive sheet 10 having a size larger than that of the opening of the frame 6. Arranged on this third transparent adhesive sheet 10 is the end at the opening of the frame 6. Now, the thickness of the third transparent adhesive sheet 10 is not particularly limited, but may be approximately equal to or larger than that of the frame 6. Further, the first transparent adhesive sheet 308 is formed to have a size smaller than that of the opening of the frame 6 and sandwiched by the second transparent adhesive sheet 9 and third transparent adhesive sheet 10 on the display panel 1.

In this embodiment, in the final state where the respective sheets have been bonded to one another, the third transparent adhesive sheet 10 suffers from crushing strength by the frame 6 and first transparent adhesive sheet 308. As a result, the elastic or plastic deformation thus generated of the third transparent adhesive sheet 10 bridges the gap generated between the end at the opening of the frame 6 and the first transparent adhesive sheet 308 can be eliminated. Likewise, the second transparent adhesive sheet 9 will be elastically or plastically deformed in bonding. These deformations, in their bonding to the side of the first transparent adhesive sheet 308, can bridge the gap between the end at the opening of the frame 6 and the first transparent adhesive sheet 308. Now, as for the relationship among the sizes of the first, second and third transparent adhesive sheets, the relationship: second adhesive sheet>third adhesive sheet>first adhesive sheet, or in their relationship including the size of the opening of the frame 6, the relationship: second adhesive sheet>third adhesive sheet>opening of the frame>first adhesive sheet is preferable because such a relationship can surely bridge the gap between the end at the opening of the frame 6 and the first transparent adhesive sheet 308.

In the above configuration, the opening of the frame is entirely filled with the transparent adhesive sheets so that generation of the air bubbles in the vicinity of the opening of the frame can be suppressed, thereby providing the display device with excellent display quality.

In the above embodiments, the explanation has been given of the display device using liquid crystal. However, without being limited to it, this invention can be also applied to not only a display device using an electro-luminescence (EL) device, but also all the display devices in which the display panel is held by the frame having the opening and the protecting cover is arranged above the display panel.

What is claimed is:

1. A display device comprising:
    a display panel having a display plane;
    a frame comprising an opening formed at an area corresponding to the display plane, for holding the periphery of the display panel;
    a protecting cover for protecting the display plane; and
    two transparent adhesive sheets arranged in the gap between the display plane and the protecting cover,
    wherein the frame covers the periphery of the display panel, and
    wherein the two transparent adhesive sheets comprises:
        a first transparent adhesive sheet, which is in proximity to the display plane, which has a thickness approximately equal to that of the end of the frame covering the periphery of the display plane of the display panel, and which has a size smaller than that of an opening formed in the frame; and
        a second transparent adhesive sheet that is in proximity to the protecting cover and bonds the frame and the first transparent adhesive sheet to the protecting cover.

2. The display device according to claim 1, wherein the thickness of the first transparent adhesive sheet is larger than that of the frame by a predetermined amount.

3. The display device according to claim 1, further comprising:
    a third transparent adhesive sheet that is arranged between the two transparent adhesive sheets and the display panel.

4. The display device according to claim 3, wherein the third transparent adhesive sheet has a size larger than that of the opening formed in the frame.

5. The display device according to claim 1, wherein the thickness of the first transparent adhesive sheet is larger than that of the end of the frame and the thickness of the first transparent adhesive sheet is reduced by a crushing force to be approximately equal to that of the end of the frame.

* * * * *